(12) United States Patent
Takaura

(10) Patent No.: US 9,080,312 B2
(45) Date of Patent: Jul. 14, 2015

(54) HYDRAULIC EXCAVATOR

(71) Applicant: KOMATSU LTD., Tokyo (JP)

(72) Inventor: Takeshi Takaura, Minoh (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/355,410

(22) PCT Filed: Dec. 6, 2013

(86) PCT No.: PCT/JP2013/082826
§ 371 (c)(1),
(2) Date: Apr. 30, 2014

(87) PCT Pub. No.: WO2014/192191
PCT Pub. Date: Dec. 4, 2014

(65) Prior Publication Data
US 2015/0159348 A1    Jun. 11, 2015

(51) Int. Cl.
*E02F 9/22* (2006.01)
*F16H 61/421* (2010.01)
*E02F 9/20* (2006.01)

(52) U.S. Cl.
CPC ............ *E02F 9/2285* (2013.01); *E02F 9/2004* (2013.01); *F16H 61/421* (2013.01)

(58) Field of Classification Search
CPC ..... F16H 61/421; E02F 9/2285; E02F 9/2004
USPC .......................................................... 701/50
See application file for complete search history.

(56) References Cited

U.S. PATENT DOCUMENTS

| 2002/0108486 A1* | 8/2002 | Sannomiya et al. ............ 91/436 |
| 2012/0060487 A1 | 3/2012 | Iizuka et al. |
| 2014/0039768 A1 | 2/2014 | Sawada et al. |

FOREIGN PATENT DOCUMENTS

| CN | 202767152 U | 3/2013 |
| CN | 203188273 U | 9/2013 |
| JP | H04-297326 A | 10/1992 |
| JP | H07-207697 A | 8/1995 |
| JP | 2010-276162 A | 12/2010 |
| JP | 2012-021313 A | 2/2012 |
| JP | 2012-237131 A | 12/2012 |

* cited by examiner

*Primary Examiner* — Mary Cheung
*Assistant Examiner* — Yuen Wong
(74) *Attorney, Agent, or Firm* — Drinker Biddle & Reath LLP

(57) ABSTRACT

There is provided a hydraulic excavator in which occurrence of minute vibrations in a control lever can be suppressed. The hydraulic excavator includes: a first pilot pressure control valve outputting a pilot pressure in accordance with operation of the control lever; an upstream pilot conduit having one end connected to the first pilot pressure control valve; a proportional solenoid valve connected to the other end of the upstream pilot conduit; a downstream pilot conduit having one end connected to the proportional solenoid valve; and a pilot switching valve for a boom having a second pilot port connected to the other end of the downstream pilot conduit, and controlling operation of the boom. A volume of the upstream pilot conduit is larger than a volume of the downstream pilot conduit.

11 Claims, 9 Drawing Sheets

HYDRAULIC EXCAVATOR

TECHNICAL FIELD

The present invention relates to a hydraulic excavator.

BACKGROUND ART

As to conventional hydraulic excavators, Japanese Patent Laying-Open No. 7-207697 (PTD 1) discloses such a configuration that an electromagnetic switching valve including an oil passage position with a throttle is provided in a conduit connected to a boom-lowering pilot port of a pilot switching valve for a boom, and a pressure sensor is provided on the boom-lowering pilot port side, and a pressure signal detected by the pressure sensor is inputted to a controller.

CITATION LIST

Patent Document

PTD 1: Japanese Patent Laying-Open No. 7-207697

SUMMARY OF INVENTION

Technical Problem

In recent years, in work vehicles, introduction of information-oriented construction has been rapidly promoted. The information-oriented construction is a system aimed at realizing highly-efficient and highly-accurate construction by detecting a position of a work implement using the information and communication technology (ICT) and automatically controlling the work implement based on the detected position of the work implement in the construction stage of a construction project.

In the case of automatically controlling the work implement in a land leveling work with a hydraulic excavator, control for raising a boom automatically and forcibly is executed when it is expected that a cutting edge of a bucket will become lower than a design surface, in order to avoid deeper excavation than the design surface.

On the other hand, the cutting edge of the bucket follows the arc-shaped path, and thus, the cutting edge of the bucket may move away from the design surface if a boom-lowering operation is not performed during a scrape-off work for forming a flat surface. Therefore, it is preferable that an operator operating the hydraulic excavator continues to perform an operation for inclining a control lever toward the boom-lowering side during the scrape-off work.

When the operator continues to perform the operation for inclining the control lever toward the boom-lowering side as described above, minute vibrations (chattering) occur in the control lever, which brings a sense of discomfort to the operator gripping the control lever.

The present invention has been made in view of the aforementioned problem and an object thereof is to provide a hydraulic excavator in which occurrence of minute vibrations in a control lever can be suppressed.

Solution to Problem

The inventor of the present invention has earnestly studied a reason why minute vibrations occur in the control lever during the boom-lowering operation. As a result, the inventor of the present invention has found that, when a pilot pressure outputted by a pilot pressure control valve in accordance with an amount of operation of the control lever fluctuates abruptly, a spool and a retainer constituting the pilot pressure control valve collide with each other repeatedly, and as a result, minute vibrations occur in the control lever. Based on this, the inventor of the present invention has obtained the findings that the occurrence of minute vibrations in the control lever can be suppressed if the fluctuations in pilot pressure can be suppressed, and has completed the present invention.

Specifically, a hydraulic excavator according to the present invention includes: a boom; a control lever; a pilot pressure control valve; an upstream pilot conduit; a proportional solenoid valve; a downstream pilot conduit; and a pilot switching valve. The control lever is operated by an operator. The pilot pressure control valve outputs a pilot pressure in accordance with operation of the control lever. The upstream pilot conduit has one end connected to the pilot pressure control valve. The proportional solenoid valve is connected to the other end of the upstream pilot conduit.

The downstream pilot conduit has one end connected to the proportional solenoid valve. The pilot switching valve controls operation of the boom. The pilot switching valve has a boom-lowering pilot port connected to the other end of the downstream pilot conduit. A volume of the upstream pilot conduit is larger than a volume of the downstream pilot conduit.

In the hydraulic excavator according to the present invention, a rate of decrease in hydraulic oil in the upstream pilot conduit when the hydraulic oil flows from the upstream pilot conduit to the downstream pilot conduit via the proportional solenoid valve can be reduced. Sharp decrease in hydraulic oil present in the upstream pilot conduit can be suppressed and fluctuations in pressure of the hydraulic oil in the upstream pilot conduit can be suppressed. Therefore, the occurrence of minute vibrations in the control lever can be suppressed.

In the hydraulic excavator, an inner diameter of the upstream pilot conduit is larger than an inner diameter of the downstream pilot conduit. Thus, such a configuration that the volume of the upstream pilot conduit is larger than the volume of the downstream pilot conduit can be realized more easily.

The hydraulic excavator further includes an oil supply conduit supplying a hydraulic oil to the pilot pressure control valve. An inner diameter of the oil supply conduit is equal to or larger than the inner diameter of the upstream pilot conduit. Thus, pressure loss of the hydraulic oil supplied to the pilot pressure control valve via the oil supply conduit can be reduced, and supplementary supply of the hydraulic oil to the pilot pressure control valve when the proportional solenoid valve is opened can be promoted. Therefore, fluctuations in pressure of the hydraulic oil in the upstream pilot conduit can be suppressed more reliably.

The hydraulic excavator further includes: a bucket having a cutting edge; and a controller controlling the hydraulic excavator. The controller controls the boom to prevent a position of the cutting edge from becoming lower than construction design data. Thus, the land leveling work can be performed in accordance with the construction design data, and therefore, the quality and efficiency of the land leveling work with the hydraulic excavator can be enhanced.

The hydraulic excavator further includes a controller controlling the hydraulic excavator. The controller transmits and receives information to and from the outside by satellite communication. Thus, the information-oriented construction based on the information transmitted and received to and from the outside becomes possible, and the highly-efficient and highly-accurate land leveling work with the hydraulic excavator can be realized.

Advantageous Effects of Invention

As described above, according to the present invention, fluctuations in hydraulic pressure outputted in accordance with the amount of operation of the control lever can be suppressed, and thus, the occurrence of minute vibrations in the control lever can be suppressed.

DESCRIPTION OF EMBODIMENTS

Embodiments of the present invention will be described hereinafter with reference to the drawings.

First Embodiment

Figure 1:
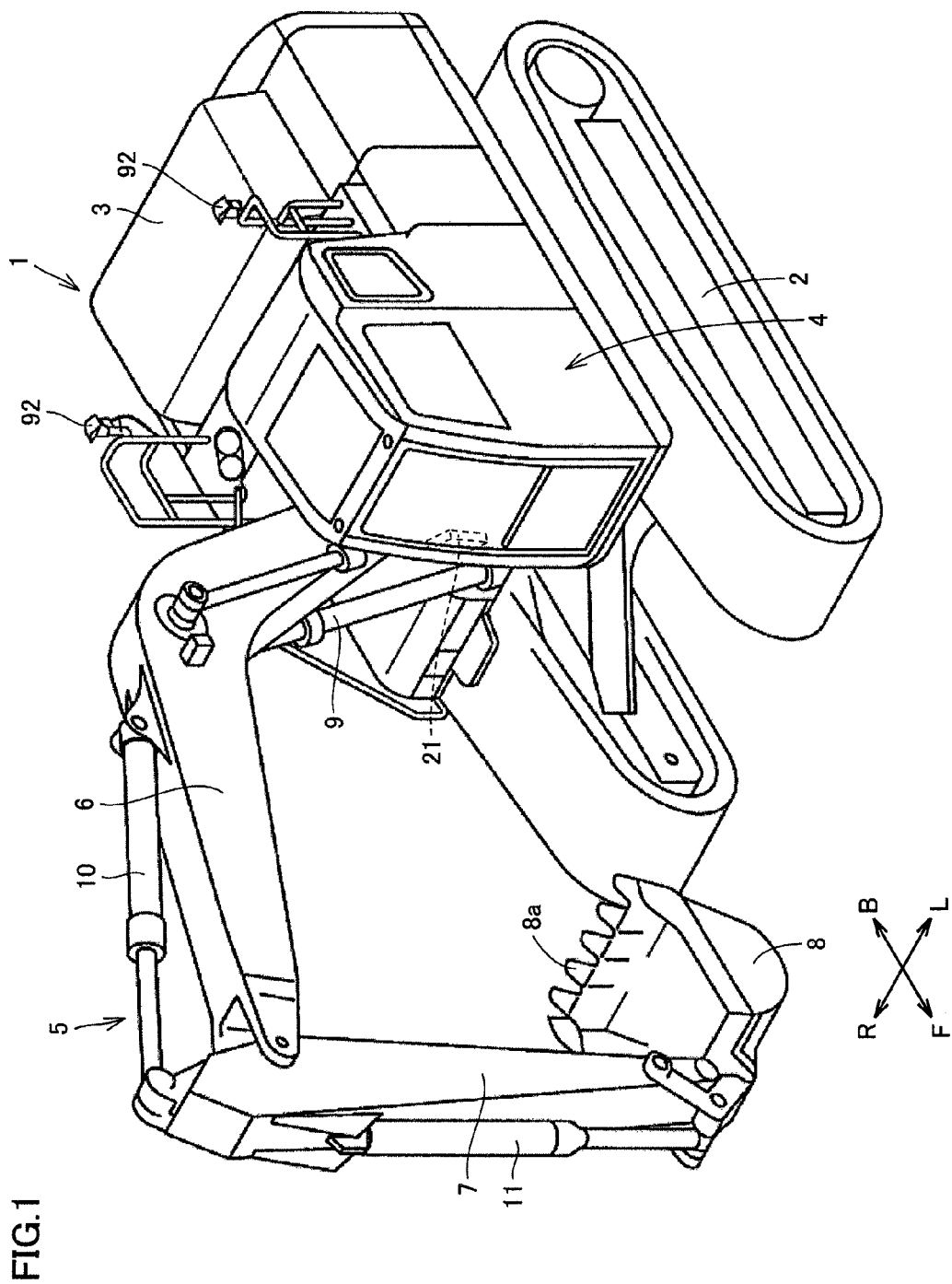
FIG. 1 is a schematic perspective view showing a configuration of a hydraulic excavator according to one embodiment of the present invention.

First, a configuration of a hydraulic excavator to which an idea of the present invention is applicable will be described. FIG. 1 is a schematic perspective view showing a configuration of a hydraulic excavator 1 according to one embodiment of the present invention. Referring to FIG. 1, hydraulic excavator 1 mainly includes an undercarriage 2, an upper revolving unit 3 and a work implement 5. Undercarriage 2 and upper revolving unit 3 constitute a work vehicle main body.

Undercarriage 2 has a pair of left and right crawler belts. It is configured to allow hydraulic excavator 1 to be self-propelled by rotation of the pair of crawler belts. Upper revolving unit 3 is disposed to be pivotable with respect to undercarriage 2.

Upper revolving unit 3 includes a cab 4 that is a space for an operator to operate hydraulic excavator 1. Cab 4 is included in the work vehicle main body. On the backward side B, upper revolving unit 3 includes an engine compartment that houses an engine, and a counter weight. In the present embodiment, the frontward side (front side) of the operator when seated in cab 4 will be referred to as frontward side F of upper revolving unit 3, and the side opposite to frontward side F, i.e., the backward side of the operator will be referred to as backward side B of upper revolving unit 3. The left side of the operator when seated will be referred to as left side L of upper revolving unit 3, and the right side of the operator when seated will be referred to as right side R of upper revolving unit 3. In the following description, it is assumed that the frontward-backward and left-right directions of upper revolving unit 3 match the frontward-backward and left-right directions of hydraulic excavator 1.

Work implement 5 that performs works such as soil excavation is pivotably supported by upper revolving unit 3 so as to be operable in the upward-downward direction. Work implement 5 has a boom 6 attached to a substantially central portion on frontward side F of upper revolving unit 3 so as to be operable in the upward-downward direction, an arm 7 attached to a tip of boom 6 so as to be operable in the backward-frontward direction, and a bucket 8 attached to a tip of arm 7 so as to be operable in the backward-frontward direction. Bucket 8 has a cutting edge 8a at a tip thereof. Boom 6, arm 7 and bucket 8 are configured to be driven by a boom cylinder 9, an arm cylinder 10 and a bucket cylinder 11 that are hydraulic cylinders, respectively.

Cab 4 is arranged on frontward side F and on left side L of upper revolving unit 3. With respect to cab 4, work implement 5 is provided on right side R that is one side portion side of cab 4. It should be noted that the arrangement of cab 4 and work implement 5 is not limited to the example shown in FIG. 1, and work implement 5 may be provided, for example, on the left side of cab 4 arranged on the frontward right side of upper revolving unit 3.

Figure 2:
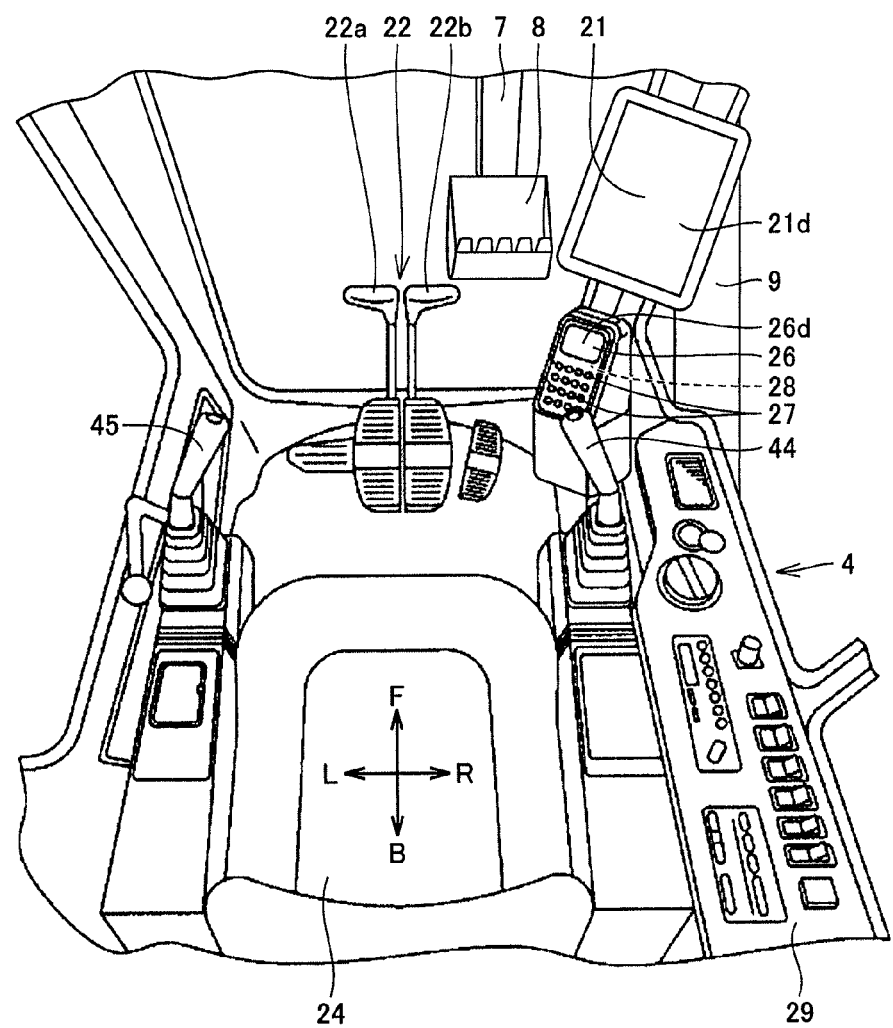
FIG. 2 is a perspective view of the inside of a cab of the hydraulic excavator.

FIG. 2 is a perspective view of the inside of cab 4 of hydraulic excavator 1. Referring to FIG. 2, an operator's seat 24 on which the operator facing toward frontward side F is seated is arranged inside cab 4. Cab 4 includes a roof portion arranged to cover operator's seat 24, and a plurality of pillars supporting the roof portion. The plurality of pillars have a front pillar arranged on frontward side F with respect to operator's seat 24, a rear pillar arranged on backward side B with respect to operator's seat 24, and an intermediate pillar arranged between the front pillar and the rear pillar. Each pillar extends along a vertical direction orthogonal to a horizontal surface, and is coupled to a floor portion and the roof portion of cab 4.

A space surrounded by each pillar and the floor and roof portions of cab 4 forms an interior space of cab 4. Operator's seat 24 is housed in the interior space of cab 4 and is arranged at a substantially center of the floor portion of cab 4. A side surface on left side L of cab 4 is provided with a door for the operator to get in or out of cab 4.

A front window is arranged on frontward side F with respect to operator's seat 24. The front window is made of a transparent material and the operator seated on operator's seat 24 can view the outside of cab 4 through the front window. For example, as shown in FIG. 2, the operator seated on operator's seat 24 can directly view bucket 8 excavating soil through the front window.

A monitor device 26 is disposed on frontward side F inside cab 4. Monitor device 26 is arranged at a corner on the frontward right side inside cab 4, and is supported by a support extending from the floor portion of cab 4. Monitor device 26 is arranged on the operator's seat 24 side with respect to the front pillar. Monitor device 26 is arranged in front of the front pillar when viewed from the operator seated on operator's seat 24.

For multipurpose use, monitor device 26 includes a planar display surface 26d having various monitor functions, a switch unit 27 having a plurality of switches to which many functions are assigned, and a sound generator 28 that expresses by sound the contents displayed on display surface 26d. This display surface 26d is configured by a graphic indicator such as a liquid crystal indicator and an organic EL indicator. Although switch unit 27 includes a plurality of key switches, the present invention is not limited thereto. Switch unit 27 may include touch panel-type touch switches.

Travel control levers (left and right travel control levers) 22a and 22b for the left and right crawler belts are provided on frontward side F of operator's seat 24. Left and right travel control levers 22a and 22b form a travel control unit 22 for controlling undercarriage 2.

A first control lever 44 for the operator on cab 4 to control driving of boom 6 and bucket 8 of work implement 5 is provided on right side R of operator's seat 24. A switch panel 29 having various switches and the like mounted thereon is also provided on right side R of operator's seat 24. A second control lever 45 for the operator to control driving of arm 7 of work implement 5 and revolving of upper revolving unit 3 is provided on left side L of operator's seat 24.

A monitor 21 is arranged above monitor device 26. Monitor 21 has a planar display surface 21d. Comparing display surface 26d of monitor device 26 and display surface 21d of monitor 21 shown in FIG. 2, display surface 21d is provided to be larger than display surface 26d. For example, monitor device 26 may have 7-inch display surface 26d, and monitor 21 may have 12-inch display surface 21d.

Monitor 21 is attached to the front pillar on right side R, which is the side close to work implement 5, of the pair of front pillars. Monitor 21 is arranged in front of the front pillar in the line of sight of the operator seated on operator's seat 24 toward the frontward right direction. By attaching monitor 21 to the front pillar on right side R in hydraulic excavator 1 including work implement 5 on right side R of cab 4, the operator can view both work implement 5 and monitor 21 with a small amount of line-of-sight movement.

Figure 3:
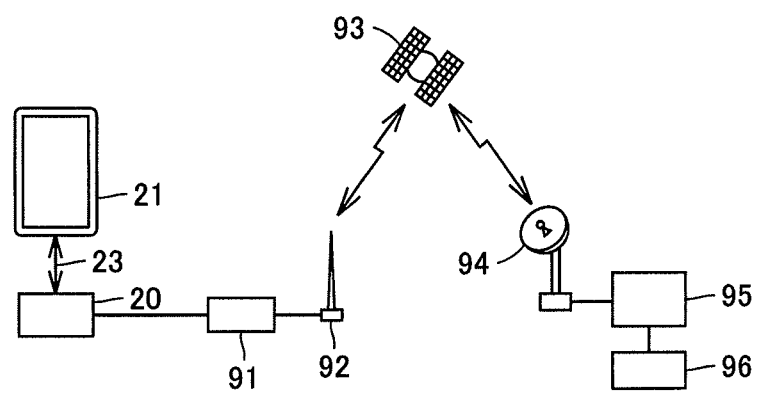
FIG. 3 is a schematic view showing a schematic configuration for transmitting and receiving information to and from the hydraulic excavator.

FIG. 3 is a schematic view showing a schematic configuration for transmitting and receiving information to and from hydraulic excavator 1. Hydraulic excavator 1 includes a controller 20. Controller 20 has a function of controlling operation of work implement 5, revolving of upper revolving unit 3, travel driving of undercarriage 2, and the like. Controller 20 and monitor 21 are connected by a bidirectional network communication cable 23 and form a communication network inside hydraulic excavator 1. Monitor 21 and controller 20 can mutually transmit and receive information via network communication cable 23. Each of monitor 21 and controller 20 is configured mainly by a computer device such as a microcomputer.

Information can be transmitted and received between controller 20 and an external monitoring station 96. In the present embodiment, controller 20 and monitoring station 96 communicate with each other by satellite communication. A communication terminal 91 having a satellite communication antenna 92 is connected to controller 20. As shown in FIG. 1, satellite communication antenna 92 is mounted on upper revolving unit 3. A network control station 95 linked by a dedicated line to a communication earth station 94 communicating with a communication satellite 93 by a dedicated communication line is connected to monitoring station 96 on the ground via the Internet and the like. As a result, data is transmitted and received between controller 20 and prescribed monitoring station 96 via communication terminal 91, communication satellite 93, communication earth station 94, and network control station 95.

An example of applying the information-oriented construction system to hydraulic excavator 1 according to the present embodiment will be described. Construction design data created by a three-dimensional CAD (Computer Aided Design) is prestored in controller 20. Monitor 21 updates and displays the externally-received current position of hydraulic excavator 1 on the screen in real time, such that the operator can constantly check the work state of hydraulic excavator 1.

Controller 20 compares the construction design data with the position and posture of work implement 5 in real time, and drives a hydraulic circuit based on the result of comparison, thereby controlling work implement 5. More specifically, controller 20 compares the position for construction based on the construction design data (design surface) with the position of bucket 8, and executes control to prevent cutting edge 8a of bucket 8 from being located lower than the design surface to prevent deeper excavation than the design surface. As a result, the construction efficiency and the construction accuracy can be enhanced, and high-quality construction can be easily performed.

Figure 4:
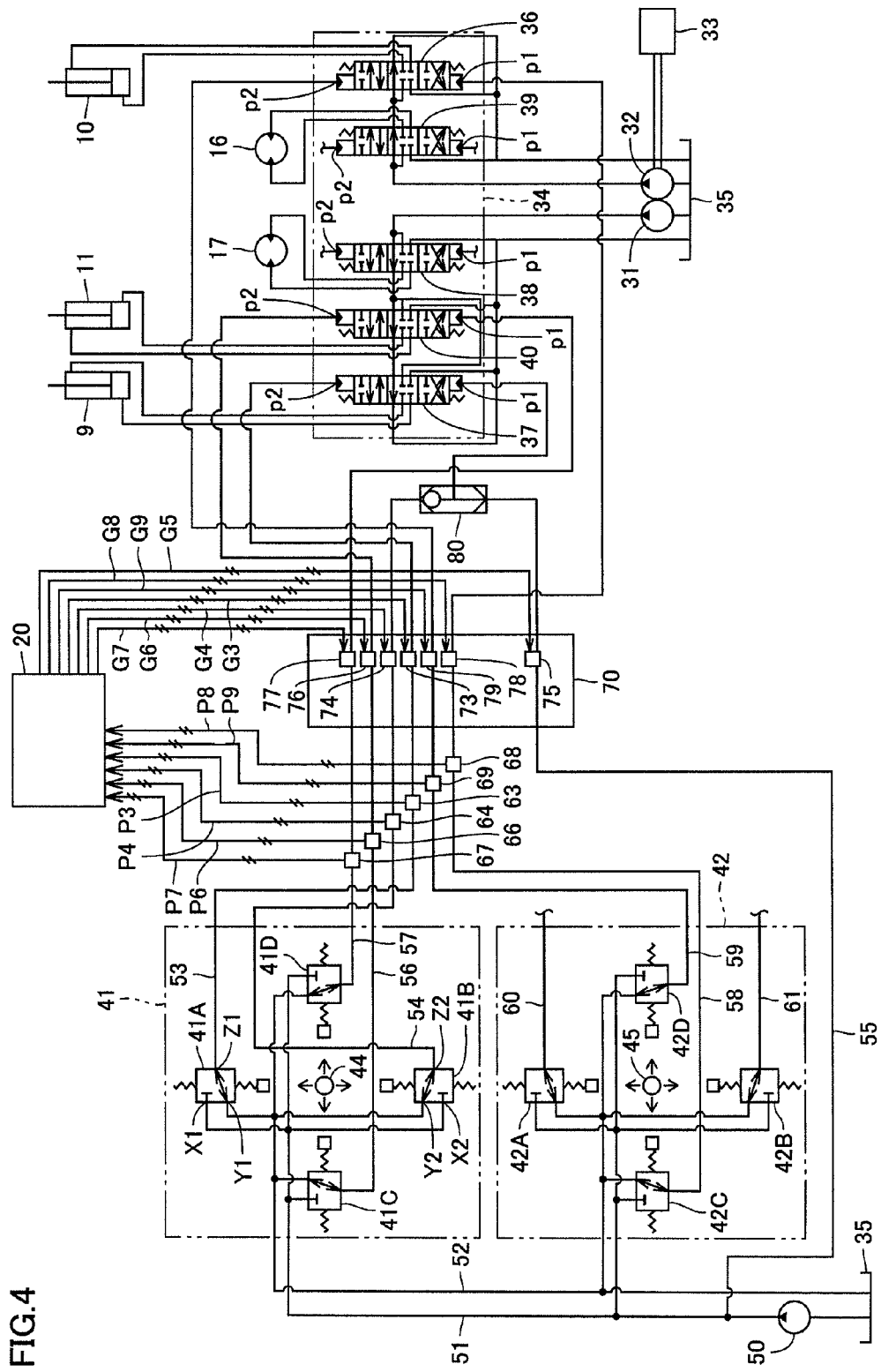
FIG. 4 is a hydraulic circuit diagram applied to the hydraulic excavator.

FIG. 4 is a hydraulic circuit diagram applied to hydraulic excavator 1. In a hydraulic system according to the present embodiment shown in FIG. 4, a first hydraulic pump 31 and a second hydraulic pump 32 are driven by an engine 33. First hydraulic pump 31 and second hydraulic pump 32 serve as a driving source for driving a hydraulic actuator such as boom cylinder 9, arm cylinder 10, bucket cylinder 11, travel motors 16 and 17, and the like. The hydraulic oil discharged from first hydraulic pump 31 and second hydraulic pump 32 is supplied to the hydraulic actuator via a main operation valve 34. The hydraulic oil supplied to the hydraulic actuator is discharged to a tank 35 via main operation valve 34.

Main operation valve 34 has a pilot switching valve for the arm 36, a pilot switching valve for the boom 37, a pilot switching valve for left travel 38, a pilot switching valve for right travel 39, and a pilot switching valve for the bucket 40. Pilot switching valve for the arm 36 controls supply and discharge of the hydraulic oil to and from arm cylinder 10. Pilot switching valve for the boom 37 controls supply and discharge of the hydraulic oil to and from boom cylinder 9. Pilot switching valve for left travel 38 controls supply and discharge of the hydraulic oil to and from left travel motor 17. Pilot switching valve for right travel 39 controls supply and discharge of the hydraulic oil to and from right travel motor 16. Pilot switching valve for the bucket 40 controls supply and discharge of the hydraulic oil to and from bucket cylinder 11.

Each of pilot switching valve for the arm 36, pilot switching valve for the boom 37, pilot switching valve for left travel 38, pilot switching valve for right travel 39, and pilot switching valve for the bucket 40 has a pair of pilot ports p1 and p2. The hydraulic oil having a prescribed pilot pressure is supplied to each of pilot ports p1 and p2, and thereby, each of pilot switching valves 36 to 40 is controlled.

The pilot pressures applied to pilot switching valve for the arm 36, pilot switching valve for the boom 37 and pilot switching valve for the bucket 40 are controlled by operating a first control lever device 41 and a second control lever device 42. The pilot pressures applied to pilot switching valve for left travel 38 and pilot switching valve for right travel 39 are controlled by operating left and right travel control levers 22a and 22b shown in FIG. 2. The operator operates first control lever device 41 and second control lever device 42, thereby controlling the operation of work implement 5 and the revolving operation of upper revolving unit 3. The operator operates left and right travel control levers 22a and 22b, thereby controlling the travelling operation of undercarriage 2.

First control lever device 41 has first control lever 44 operated by the operator, a first pilot pressure control valve 41A, a second pilot pressure control valve 41B, a third pilot pressure control valve 41C, and a fourth pilot pressure control valve 41D. First pilot pressure control valve 41A, second pilot pressure control valve 41B, third pilot pressure control valve 41C, and fourth pilot pressure control valve 41D are provided to correspond to the four directions, i.e., the frontward-backward and left-right directions, of first control lever 44.

Second control lever device 42 has second control lever 45 operated by the operator, a fifth pilot pressure control valve 42A, a sixth pilot pressure control valve 42B, a seventh pilot pressure control valve 42C, and an eighth pilot pressure control valve 42D. Fifth pilot pressure control valve 42A, sixth pilot pressure control valve 42B, seventh pilot pressure control valve 42C, and eighth pilot pressure control valve 42D are provided to correspond to the four directions, i.e., the frontward-backward and left-right directions of second control lever 45.

Pilot pressure control valves 41A to 41D and 42A to 42D for controlling driving of hydraulic cylinders 9, 10 and 11 for work implement 5 as well as a swing motor are connected to first control lever 44 and second control lever 45, respectively. Pilot pressure control valves for controlling driving of right and left travel motors 16 and 17 are connected to left and right travel control levers 22a and 22b, respectively.

First pilot pressure control valve 41A has a first pump port X1, a first tank port Y1 and a first supply/discharge port Z1. First pump port X1 is connected to a pump flow path 51. First tank port Y1 is connected to a tank flow path 52. Pump flow path 51 and tank flow path 52 are connected to tank 35 that stores the hydraulic oil. A third hydraulic pump 50 is provided in pump flow path 51. Third hydraulic pump 50 is different from first hydraulic pump 31 and second hydraulic pump 32 described above. However, instead of third hydraulic pump 50, first hydraulic pump 31 or second hydraulic pump 32 may be used. First supply/discharge port Z1 is connected to a first pilot conduit 53.

In accordance with the operation of first control lever 44, first pilot pressure control valve 41A is switched between an output state and a discharge state. In the output state, first pilot pressure control valve 41A causes first pump port X1 and first supply/discharge port Z1 to communicate with each other, and outputs the hydraulic oil having a pressure corresponding to an amount of operation of first control lever 44 from first supply/discharge port Z1 to first pilot conduit 53. In the discharge state, first pilot pressure control valve 41A causes first tank port Y1 and first supply/discharge port Z1 to communicate with each other.

Second pilot pressure control valve 41B has a second pump port X2, a second tank port Y2 and a second supply/discharge port Z2. Second pump port X2 is connected to pump flow path 51. Second tank port Y2 is connected to tank flow path 52. Second supply/discharge port Z2 is connected to a second pilot conduit 54.

In accordance with the operation of first control lever 44, second pilot pressure control valve 41B is switched between an output state and a discharge state. In the output state, second pilot pressure control valve 41B causes second pump port X2 and second supply/discharge port Z2 to communicate with each other, and outputs the hydraulic oil having a pressure corresponding to an amount of operation of first control lever 44 from second supply/discharge port Z2 to second pilot conduit 54. In the discharge state, second pilot pressure control valve 41B causes second tank port Y2 and second supply/discharge port Z2 to communicate with each other.

First pilot pressure control valve 41A and second pilot pressure control valve 41B form a pair and correspond to the operation directions of first control lever 44 that are opposite to each other. For example, first pilot pressure control valve 41A corresponds to the operation for inclining first control lever 44 toward the frontward direction, and second pilot pressure control valve 41B corresponds to the operation for inclining first control lever 44 toward the backward direction. Either first pilot pressure control valve 41A or second pilot pressure control valve 41B is selected in accordance with the operation of first control lever 44. That is, when first pilot pressure control valve 41A is in the output state, second pilot pressure control valve 41B is in the discharge state. When first pilot pressure control valve 41A is in the discharge state, second pilot pressure control valve 41B is in the output state.

First pilot pressure control valve 41A controls supply and discharge of the hydraulic oil to and from second pilot port p2 of pilot switching valve for the boom 37. Second pilot pressure control valve 41B controls supply and discharge of the hydraulic oil to and from first pilot port p1 of pilot switching valve for the boom 37. In accordance with the operation of first control lever 44, supply and discharge of the hydraulic oil to and from boom cylinder 9 are controlled, and extension and contraction of boom cylinder 9 are controlled. As a result, the operation for raising or lowering boom 6 is controlled in accordance with the operation of first control lever 44.

First pilot port p1 of pilot switching valve for the boom 37 has a function as a boom-raising pilot port supplied with the hydraulic oil at the time of the operation for raising boom 6. Second pilot port p2 of pilot switching valve for the boom 37 has a function as a boom-lowering pilot port supplied with the hydraulic oil at the time of the operation for lowering boom 6.

The pressure (pilot pressure) of the hydraulic oil supplied to first pilot conduit 53 via first pilot pressure control valve 41A is detected by a hydraulic pressure sensor 63. Hydraulic pressure sensor 63 outputs, to controller 20, a pressure signal P3 that is an electric detection signal corresponding to the detected pilot pressure of the hydraulic oil. In addition, the pressure (pilot pressure) of the hydraulic oil supplied to second pilot conduit 54 via second pilot pressure control valve 41B is detected by a hydraulic pressure sensor 64. Hydraulic pressure sensor 64 outputs, to controller 20, a pressure signal P4 that is an electric detection signal corresponding to the detected pilot pressure of the hydraulic oil.

A relay block 70 is provided in a hydraulic pressure path connecting first and second control lever devices 41 and 42 and main operation valve 34. Relay block 70 is configured to include a plurality of proportional solenoid valves 73 to 79. Proportional solenoid valve 73 is provided in first pilot conduit 53. Hydraulic pressure sensor 63 is provided between first pilot pressure control valve 41A and proportional solenoid valve 73 in first pilot conduit 53. Proportional solenoid valve 74 is provided in second pilot conduit 54. Hydraulic pressure sensor 64 is provided between second pilot pressure control valve 41B and proportional solenoid valve 74 in second pilot conduit 54. Proportional solenoid valves 73 and 74 are provided to control the operation for moving boom 6 upwardly and downwardly in accordance with the operation of first control lever 44.

Based on the pilot pressure of first pilot conduit 53 detected by hydraulic pressure sensor 63, controller 20 controls proportional solenoid valve 73. That is, hydraulic pressure sensor 63 detects the hydraulic pressure generated in first pilot conduit 53 between first pilot pressure control valve 41A and proportional solenoid valve 73 in accordance with the operation of first control lever 44. In accordance with the hydraulic pressure detected by hydraulic pressure sensor 63, controller 20 outputs an instruction signal G3 to proportional solenoid valve 73 and adjusts the opening degree thereof, thereby changing a flow rate of the hydraulic oil flowing through first pilot conduit 53, and controlling the hydraulic pressure transmitted to second pilot port p2 of pilot switching valve for the boom 37.

Based on the hydraulic pressure detected by hydraulic pressure sensor 63, controller 20 controls the opening degree of proportional solenoid valve 73 and outputs, to proportional solenoid valve 73, an instruction signal for instructing boom-lowering. In accordance with the degree of the hydraulic pressure transmitted to second pilot port p2, the speed of boom 6 when lowered is adjusted.

In addition, based on the pilot pressure of second pilot conduit 54 detected by hydraulic pressure sensor 64, controller 20 controls proportional solenoid valve 74. That is, hydraulic pressure sensor 64 detects the hydraulic pressure generated in second pilot conduit 54 between second pilot pressure control valve 41B and proportional solenoid valve 74 in accordance with the operation of first control lever 44. In accordance with the hydraulic pressure detected by hydraulic pressure sensor 64, controller 20 outputs an instruction signal G4 to proportional solenoid valve 74 and adjusts the opening degree thereof, thereby changing a flow rate of the hydraulic oil flowing through second pilot conduit 54, and controlling the hydraulic pressure transmitted to first pilot port p1 of pilot switching valve for the boom 37.

Based on the hydraulic pressure detected by hydraulic pressure sensor 64, controller 20 controls the opening degree of proportional solenoid valve 74 and outputs, to proportional solenoid valve 74, an instruction signal for instructing boom-raising. In accordance with the degree of the hydraulic pressure transmitted to first pilot port p1, the speed of boom 6 when raised is adjusted.

A shuttle valve 80 is provided in second pilot conduit 54. Shuttle valve 80 has two entrance ports and one exit port. The exit port of shuttle valve 80 is connected to first pilot port p1 of pilot switching valve for the boom 37 via second pilot conduit 54. One entrance port of shuttle valve 80 is connected to second pilot pressure control valve 41B via second pilot conduit 54. The other entrance port of shuttle valve 80 is connected to a pump flow path 55.

Pump flow path 55 branches off from pump flow path 51. One end of pump flow path 55 is connected to pump flow path 51 and the other end of pump flow path 55 is connected to shuttle valve 80. The hydraulic oil transported by third hydraulic pump 50 flows to first control lever device 41 and second control lever device 42 via pump flow path 51, and also flows to shuttle valve 80 via pump flow paths 51 and 55.

Shuttle valve 80 is a shuttle valve of higher pressure priority type. Shuttle valve 80 compares the hydraulic pressure in second pilot conduit 54 connected to one entrance port and the hydraulic pressure in pump flow path 55 connected to the other entrance port, and selects the higher pressure. Shuttle valve 80 causes a higher pressure-side flow path of second pilot conduit 54 and pump flow path 55 to communicate with the exit port, and supplies the hydraulic oil flowing through this higher pressure-side flow path to first pilot port p1 of pilot switching valve for the boom 37.

A proportional solenoid valve 75 included in relay block 70 is provided in pump flow path 55. Proportional solenoid valve 75 is a valve for forcible boom-raising intervention. Proportional solenoid valve 75 receives an instruction signal G5 outputted from controller 20, and adjusts the opening degree thereof. Regardless of the operation of first control lever device 41 by the operator, controller 20 outputs instruction signal G5 to proportional solenoid valve 75 and adjusts the opening degree thereof, thereby changing a flow rate of the hydraulic oil flowing through pump flow path 55, and controlling the hydraulic pressure transmitted to first pilot port p1 of pilot switching valve for the boom 37. By adjustment of the opening degree of proportional solenoid valve 75, controller 20 controls the operation for forcibly raising boom 6.

Third pilot pressure control valve 41C and fourth pilot pressure control valve 41D have configurations similar to those of first pilot pressure control valve 41A and second pilot pressure control valve 41B described above. Similarly to first pilot pressure control valve 41A and second pilot pressure control valve 41B, third pilot pressure control valve 41C and fourth pilot pressure control valve 41D form a pair, and either third pilot pressure control valve 41C or fourth pilot pressure control valve 41D is selected in accordance with the operation of first control lever 44. For example, third pilot pressure control valve 41C corresponds to the operation for inclining first control lever 44 toward the left direction, and fourth pilot pressure control valve 41D corresponds to the operation for inclining first control lever 44 toward the right direction.

Third pilot pressure control valve 41C is connected to pump flow path 51, tank flow path 52 and a third pilot conduit 56. Third pilot pressure control valve 41C controls supply and discharge of the hydraulic oil to and from second pilot port p2 of pilot switching valve for the bucket 40. Fourth pilot pressure control valve 41D is connected to pump flow path 51, tank flow path 52 and a fourth pilot conduit 57. Fourth pilot pressure control valve 41D controls supply and discharge of the hydraulic oil to and from first pilot port p1 of pilot switching valve for the bucket 40. In accordance with the operation of first control lever 44, supply and discharge of the hydraulic oil to and from bucket cylinder 11 are controlled, and extension and contraction of bucket cylinder 11 are controlled. As a result, the operation of bucket 8 toward the excavation direction or the open direction is controlled in accordance with the operation of first control lever 44.

The pressure (pilot pressure) of the hydraulic oil supplied to third pilot conduit 56 via third pilot pressure control valve 41C is detected by a hydraulic pressure sensor 66. Hydraulic pressure sensor 66 outputs, to controller 20, a pressure signal P6 corresponding to the detected pilot pressure of the hydraulic oil. A proportional solenoid valve 76 is provided in third pilot conduit 56 connecting third pilot pressure control valve 41C and second pilot port p2 of pilot switching valve for the bucket 40. In accordance with the hydraulic pressure detected by hydraulic pressure sensor 66, controller 20 outputs an instruction signal G6 to proportional solenoid valve 76, and controls the hydraulic pressure transmitted to second pilot port p2 of pilot switching valve for the bucket 40. In accordance with the degree of the hydraulic pressure transmitted to second pilot port p2, the speed of bucket 8 when moved toward the excavation direction is adjusted.

The pressure (pilot pressure) of the hydraulic oil supplied to fourth pilot conduit 57 via fourth pilot pressure control valve 41D is detected by a hydraulic pressure sensor 67. Hydraulic pressure sensor 67 outputs, to controller 20, a pressure signal P7 corresponding to the detected pilot pressure of the hydraulic oil. A proportional solenoid valve 77 is provided in fourth pilot conduit 57 connecting fourth pilot pressure control valve 41D and first pilot port p1 of pilot switching valve for the bucket 40. In accordance with the hydraulic pressure detected by hydraulic pressure sensor 67, controller 20 outputs an instruction signal G7 to proportional solenoid valve 77, and controls the hydraulic pressure transmitted to first pilot port p1 of pilot switching valve for the bucket 40. In accordance with the degree of the hydraulic pressure transmitted to first pilot port p1, the speed of bucket 8 when moved toward the open direction is adjusted.

Fifth pilot pressure control valve 42A, sixth pilot pressure control valve 42B, seventh pilot pressure control valve 42C, and eighth pilot pressure control valve 42D have configurations similar to those of first pilot pressure control valve 41A, second pilot pressure control valve 41B, third pilot pressure control valve 41C, and fourth pilot pressure control valve 41D described above. Fifth pilot pressure control valve 42A and sixth pilot pressure control valve 42B form a pair, and either fifth pilot pressure control valve 42A or sixth pilot pressure control valve 42B is selected in accordance with the operation of second control lever 45. Seventh pilot pressure control valve 42C and eighth pilot pressure control valve 42D form a pair, and either seventh pilot pressure control valve 42C or eighth pilot pressure control valve 42D is selected in accordance with the operation of second control lever 45.

For example, fifth pilot pressure control valve 42A corresponds to the operation for inclining second control lever 45 toward the frontward direction, and sixth pilot pressure control valve 42B corresponds to the operation for inclining second control lever 45 toward the backward direction. Seventh pilot pressure control valve 42C corresponds to the operation for inclining second control lever 45 toward the left direction, and eighth pilot pressure control valve 42D corresponds to the operation for inclining second control lever 45 toward the right direction.

Fifth pilot pressure control valve 42A is connected to pump flow path 51, tank flow path 52 and a fifth pilot conduit 60. Sixth pilot pressure control valve 42B is connected to pump flow path 51, tank flow path 52 and a sixth pilot conduit 61. A not-shown electric motor for revolving upper revolving unit 3 is controlled based on the pressure of the hydraulic oil supplied to fifth pilot conduit 60 via fifth pilot pressure control valve 42A and the pressure of the hydraulic oil supplied to sixth pilot conduit 61 via sixth pilot pressure control valve 42B. Rotational driving of this electric motor when the hydraulic oil is supplied to fifth pilot conduit 60 is opposite to rotational driving of the electric motor when the hydraulic oil is supplied to sixth pilot conduit 61. In accordance with the direction of operation and the amount of operation of second control lever 45, the revolving direction and the revolving speed of upper revolving unit 3 are controlled.

Seventh pilot pressure control valve 42C is connected to pump flow path 51, tank flow path 52 and a seventh pilot conduit 58. Seventh pilot pressure control valve 42C controls supply and discharge of the hydraulic oil to and from first pilot port p1 of pilot switching valve for the arm 36. Eighth pilot pressure control valve 42D is connected to pump flow path 51, tank flow path 52 and an eighth pilot conduit 59. Eighth pilot pressure control valve 42D controls supply and discharge of the hydraulic oil to and from second pilot port p2 of pilot switching valve for the arm 36. In accordance with the operation of second control lever 45, supply and discharge of the hydraulic oil to and from arm cylinder 10 are controlled, and extension and contraction of arm cylinder 10 are controlled. As a result, the operation for relatively rotating arm 7 with respect to boom 6 is controlled in accordance with the operation of second control lever 45.

The pressure (pilot pressure) of the hydraulic oil supplied to seventh pilot conduit 58 via seventh pilot pressure control valve 42C is detected by a hydraulic pressure sensor 68. Hydraulic pressure sensor 68 outputs, to controller 20, a pressure signal P8 corresponding to the detected pilot pressure of the hydraulic oil. A proportional solenoid valve 78 is provided in seventh pilot conduit 58 connecting seventh pilot pressure control valve 42C and first pilot port p1 of pilot switching valve for the arm 36. In accordance with the hydraulic pressure detected by hydraulic pressure sensor 68, controller 20 outputs an instruction signal G8 to proportional solenoid valve 78, and controls the hydraulic pressure transmitted to first pilot port p1 of pilot switching valve for the arm 36. In accordance with the degree of the hydraulic pressure transmitted to first pilot port p1, the speed of arm 7 when moved toward the direction of extending arm 7, i.e., toward the direction in which arm 7 moves away from upper revolving unit 3, is adjusted.

The pressure (pilot pressure) of the hydraulic oil supplied to eighth pilot conduit 59 via eighth pilot pressure control valve 42D is detected by a hydraulic pressure sensor 69. Hydraulic pressure sensor 69 outputs, to controller 20, a pressure signal P9 corresponding to the detected pilot pressure of the hydraulic oil. A proportional solenoid valve 79 is provided in eighth pilot conduit 59 connecting eighth pilot pressure control valve 42D and second pilot port p2 of pilot switching valve for the arm 36. In accordance with the hydraulic pressure detected by hydraulic pressure sensor 69, controller 20 outputs an instruction signal G9 to proportional solenoid valve 79, and controls the hydraulic pressure transmitted to second pilot port p2 of pilot switching valve for the arm 36. In accordance with the degree of the hydraulic pressure transmitted to second pilot port p2, the speed of arm 7 when moved toward the direction of bending arm 7, i.e., toward the direction in which arm 7 comes closer to upper revolving unit 3, is adjusted.

The setting of a correspondence relationship between the operation directions of first and second control levers 44 and 45 and the operation of work implement 5 and the revolving operation of upper revolving unit 3 may be switchable to desired patterns. For example, first pilot pressure control valve 41A and second pilot pressure control valve 41B may correspond to the operations for inclining first control lever 44 toward the frontward and backward directions, respectively, or may correspond to the operations for inclining first control lever 44 toward the left and right directions, respectively.

Figure 5:
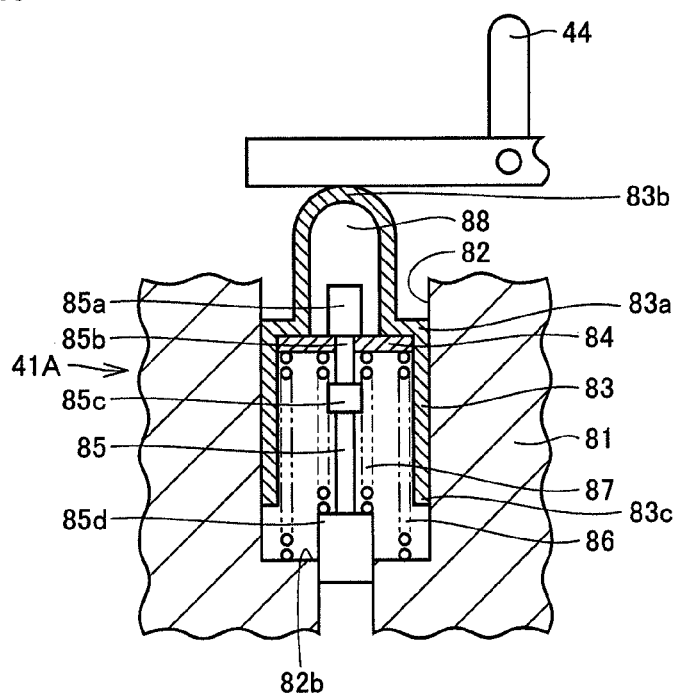
FIG. 5 is a cross-sectional view of a pilot pressure control valve at the neutral position.

FIG. 5 is a cross-sectional view of the pilot pressure control valve at the neutral position. Although first pilot pressure control valve 41A is described by way of example in FIG. 5 and below-described FIG. 6, other pilot pressure control valves 41B to 41D and 42A to 42D also have configurations similar to that of first pilot pressure control valve 41A and the operations thereof are also the same.

A hollow and closed-end cylindrical cylinder portion 82 is formed in a valve main body 81, and a piston 83 is arranged inside cylinder portion 82. Piston 83 is provided to be capable of reciprocating along the axial direction of cylinder portion 82. Piston 83 has a stepped portion 83a, and a diameter of piston 83 changes at stepped portion 83a. Piston 83 has an upper end 83b at an end on the side where the diameter gets smaller at stepped portion 83a (on the upper side in FIGS. 5 and 6), and has a lower end 83c at an end on the side where the diameter gets larger at stepped portion 83a (on the lower side in FIGS. 5 and 6). The diameter of lower end 83c is larger than that of upper end 83b, and upper end 83b is provided to have a smaller diameter than that of lower end 83c.

At upper end 83b, piston 83 is in contact with first control lever 44. Upper end 83b has a spherical outer surface, which allows piston 83 to smoothly move along the axial direction of cylinder portion 82 in line with the operation of first control lever 44. Lower end 83c of piston 83 faces a bottom surface 82b of cylinder portion 82.

Piston 83 is formed to be hollow. A plate-like retainer 84 is provided on an inner wall of stepped portion 83a of piston 83. Retainer 84 has, at a central portion thereof, a through hole passing through retainer 84 in the thickness direction. A spool 85 is arranged to pass through the through hole of retainer 84. Spool 85 is arranged in a hollow space defined by piston 83. Retainer 84 is provided to be capable of reciprocating along the axial direction of cylinder portion 82 in line with the operation of piston 83. Spool 85 is also provided to be capable of reciprocating along the axial direction of cylinder portion 82.

Spool 85 has a tip large-diameter portion 85a that is an end on the upper end 83b side of piston 83, a small-diameter portion 85b having a smaller diameter than that of tip large-diameter portion 85a, and an intermediate large-diameter portion 85c having a larger diameter than that of small-diameter portion 85b. As compared with the through hole formed in retainer 84, tip large-diameter portion 85a and intermediate large-diameter portion 85c are provided to have larger diameters than that of the through hole, and small-diameter portion 85b is provided to have a smaller diameter than that of the through hole. Small-diameter portion 85b can be inserted into the through hole of retainer 84, whereas tip large-diameter portion 85a and intermediate large-diameter portion 85c cannot be inserted into the through hole of retainer 84.

The length of small-diameter portion 85b is larger than the thickness of retainer 84. Therefore, within the range of the length of small-diameter portion 85b, spool 85 is provided to be capable of relatively reciprocating along the axial direction of cylinder portion 82 with respect to retainer 84. Tip large-diameter portion 85a and intermediate large-diameter portion 85c restrict the relative upward and downward movement of spool 85 with respect to retainer 84. Within the range from a position where retainer 84 is in contact with tip large-diameter portion 85a to a position where retainer 84 is in contact with intermediate large-diameter portion 85c, spool 85 is relatively movable with respect to retainer 84.

A main spring 86 is provided between retainer 84 and bottom surface 82b of cylinder portion 82. Main spring 86 pushes up piston 83 in the upward direction in FIG. 5 and retains piston 83, and presses retainer 84 against piston 83. Spool 85 has a stepped portion 85d, and a spring 87 is provided between this stepped portion 85d and retainer 84. Spring 87 is provided on an outer circumference of spool 85 and on an inner circumference of main spring 86. Spring 87 defines a relative position of retainer 84 and spool 85 such that spool 85 is pushed down in the downward direction in FIG. 5 and tip large-diameter portion 85a of spool 85 comes into contact with retainer 84.

Main spring 86 generates reactive force in the direction in which lower end 83c of piston 83 comes closer to bottom surface 82b of cylinder portion 82 (in the downward direction in the figure), the reactive force being proportional to an amount of relative movement of piston 83 with respect to cylinder portion 82. Spring 87 generates reactive force in the direction in which intermediate large-diameter portion 85c of spool 85 comes closer to retainer 84, the reactive force being proportional to an amount of relative movement of spool 85 with respect to retainer 84.

FIG. 5 shows a state of first pilot pressure control valve 41A when first control lever 44 is in a neutral position where first control lever 44 is not inclined toward any directions. At this time, retainer 84 is pressed against stepped portion 83a of piston 83 by the action of main spring 86. In addition, tip large-diameter portion 85a of spool 85 and retainer 84 are in contact with each other and retained by the action of spring 87.

Figure 6:
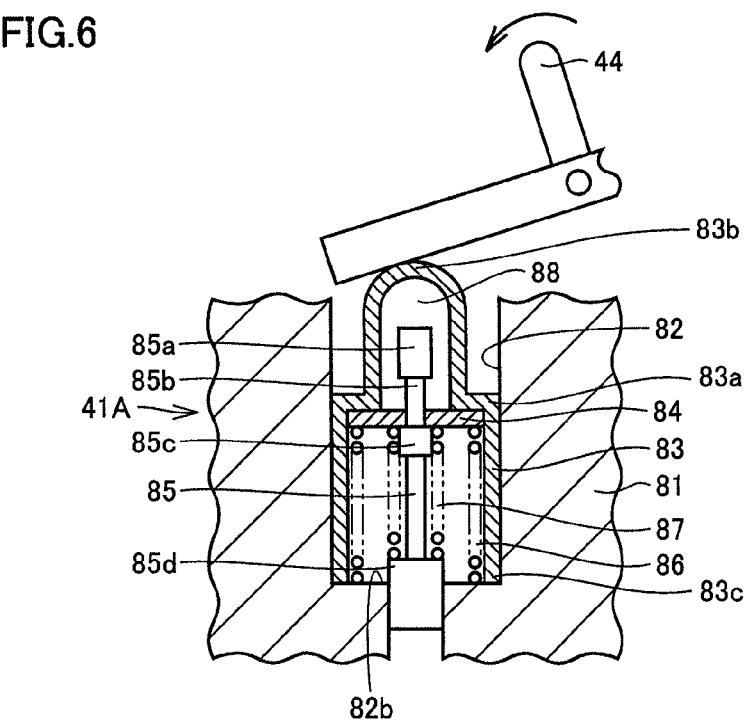
FIG. 6 is a cross-sectional view of the pilot pressure control valve during the valve operation.

FIG. 6 is a cross-sectional view of the pilot pressure control valve during the valve operation. FIG. 6 shows a state in which first control lever 44 is inclined toward the first pilot pressure control valve 41A side and upper end 83b of piston 83 is pressed by first control lever 44, and as a result, piston 83 is displaced in the downward direction in FIG. 6. Piston 83 relatively moves with respect to cylinder portion 82 in the downward direction in FIG. 6, i.e., in the direction in which lower end 83c of piston 83 comes closer to bottom surface 82b of cylinder portion 82. Retainer 84 is pushed down by stepped portion 83a of piston 83 and relatively moves together with piston 83 in the direction in which retainer 84 comes closer to bottom surface 82b.

Retainer 84 relatively moves with respect to spool 85 in the direction in which retainer 84 moves away from tip large-diameter portion 85a of spool 85 and comes closer to intermediate large-diameter portion 85c. While retainer 84 is moving along small-diameter portion 85b of spool 85, retainer 84 does not apply stress to spool 85 and spool 85 is maintained in the original position shown in FIG. 5. When piston 83 is further pushed down with retainer 84 coming into contact with intermediate large-diameter portion 85c as a result of continued movement of retainer 84, spool 85 relatively moves with respect to cylinder portion 82, together with piston 83 and retainer 84.

Due to this movement of spool 85, the hydraulic oil having a prescribed pilot pressure is supplied from first pilot pressure control valve 41A to first pilot conduit 53. As a result, the pilot pressure is supplied to pilot port p2 of pilot switching valve for the boom 37 via first pilot conduit 53 and the operation of boom 6 in the direction of lowering boom 6 is controlled. A flow rate of the hydraulic oil supplied to boom cylinder 9 is determined by the operation for inclining first control lever 44 by the operator. As the inclination angle of first control lever 44 becomes larger, the flow rate of the hydraulic oil becomes larger and the moving speed of the spool of pilot switching valve for the boom 37 also becomes larger.

Figure 7:
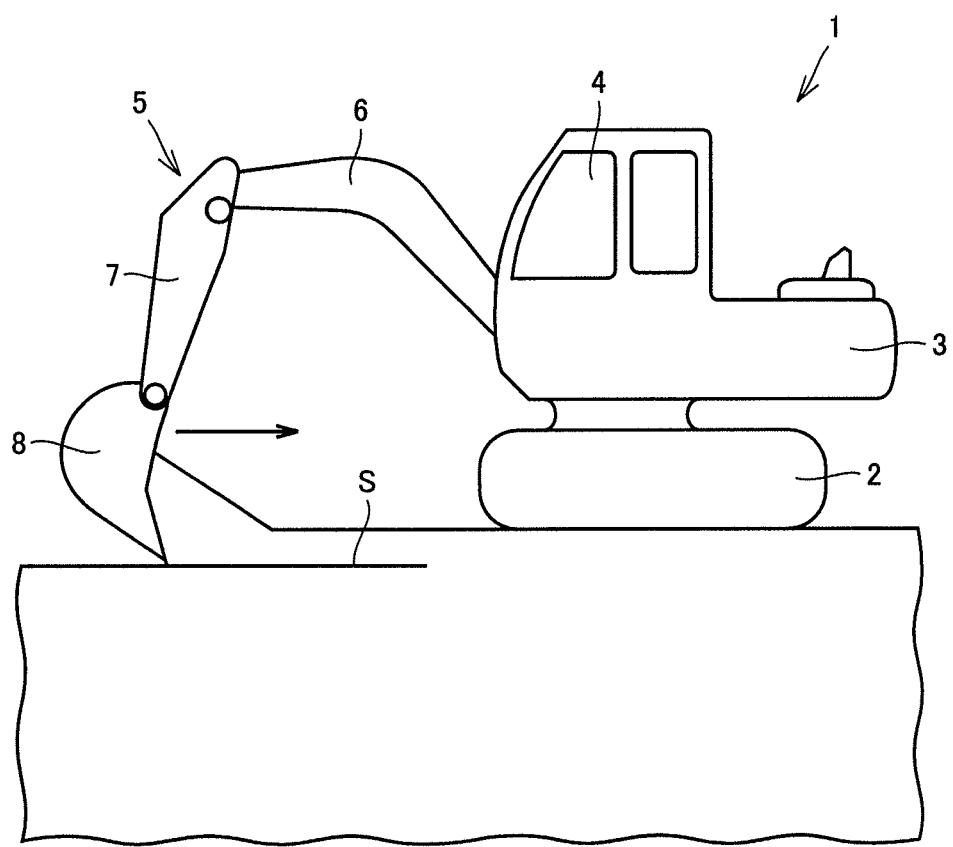
FIG. 7 is a schematic view of a land leveling work with the hydraulic excavator.

The land leveling work with hydraulic excavator 1 having the aforementioned configuration will be described below. FIG. 7 is a schematic view of the land leveling work with hydraulic excavator 1. A design surface S shown in FIG. 7 represents a target landform in accordance with the construction design data prestored in controller 20 (FIG. 4). Controller 20 controls work implement 5 based on the construction design data and the current positional information of work implement 5. As shown by an arrow in FIG. 7, work implement 5 is operated such that cutting edge 8a (refer to FIG. 1) of bucket 8 moves along design surface S, and thereby, the ground is leveled by cutting edge 8a of bucket 8 and land leveling into the design landform is performed.

Cutting edge 8a of bucket 8 moves to follow the arc-shaped path. Therefore, when design surface S is a flat surface, cutting edge 8a of bucket 8 may move away from the design surface if the operation for lowering boom 6 is not performed. Therefore, the operator operating work implement 5 operates second control lever 45 to perform the excavation operation by arm 7, and also continues to perform the operation for inclining first control lever 44 toward the first pilot pressure control valve 41A side to perform the operation for lowering boom 6.

In the case where cutting edge 8a of bucket 8 moves to be lower than design surface S and excavates the ground excessively when work implement 5 is operated in accordance with the aforementioned operator's operation, an instruction for forcibly raising boom 6 is outputted from controller 20. When it is expected that cutting edge 8a of bucket 8 will move to be lower than design surface S, controller 20 executes control for automatically raising boom 6 to prevent cutting edge 8a of bucket 8 from becoming lower than design surface S. At this time, controller 20 outputs instruction signal G3 for decreasing the opening degree of proportional solenoid valve 73 and instruction signal G5 for increasing the opening degree of proportional solenoid valve 75. As a result, proportional solenoid valve 73 that has been in the open state enters the fully-closed state, and proportional solenoid valve 75 that has been in the fully-closed state enters the open state.

When proportional solenoid valve 75 is opened, the discharge pressure on the exit side of third hydraulic pump 50 is applied to shuttle valve 80 via pump flow path 55. Shuttle valve 80 of higher pressure priority type operates to cause pump flow path 55 and first pilot port p1 of pilot switching valve for the boom 37 to communicate with each other. As a result, the high-pressure hydraulic oil is supplied to first pilot port p1 of pilot switching valve for the boom 37, and thus, the operation for raising boom 6 is performed.

In the case where cutting edge 8a of bucket 8 moves away from the ground when the operation for raising boom 6 is continued, forcible raising of boom 6 is stopped and an instruction for lowering boom 6 is outputted from controller 20 in accordance with the lowering operation of first control lever 44. At this time, controller 20 outputs instruction signal G3 for increasing the opening degree of proportional solenoid valve 73 and instruction signal G5 for decreasing the opening degree of proportional solenoid valve 75. As a result, proportional solenoid valve 73 that has been in the fully-closed state enters the open state, and proportional solenoid valve 75 that has been in the open state enters the fully-closed state.

When proportional solenoid valve 73 is opened, the hydraulic oil having a prescribed pilot pressure is supplied to second pilot port p2 of pilot switching valve for the boom 37 via first pilot conduit 53, and thus, the operation for lowering boom 6 is performed.

Pump flow path 55 has a function as a boom-raising pilot conduit connected to first pilot port p1 of pilot switching valve for the boom 37 via shuttle valve 80. First pilot conduit 53 has a function as a boom-lowering pilot conduit connected to second pilot port p2 of pilot switching valve for the boom 37. Proportional solenoid valve 75 provided in pump flow path 55 has a function as a boom-raising proportional solenoid valve. Proportional solenoid valve 73 provided in first pilot conduit 53 has a function as a boom-lowering proportional solenoid valve.

Hydraulic pressure sensor 63 detects the hydraulic pressure generated in first pilot conduit 53 between first pilot pressure control valve 41A and proportional solenoid valve 73 in accordance with the operation of first control lever 44. Based on the hydraulic pressure detected by hydraulic pressure sensor 63, controller 20 outputs instruction signal G3 to proportional solenoid valve 73 and controls the opening degree of proportional solenoid valve 73. Controller 20 outputs instruction signal G5 to proportional solenoid valve 75 and controls the opening degree of proportional solenoid valve 75.

When the current position of cutting edge 8a of bucket 8 is compared with design surface S and cutting edge 8a is located at a position higher than design surface S, control for lowering boom 6 is executed. When it becomes highly likely that cutting edge 8a erodes design surface S, control for raising boom 6 is executed. Therefore, when the current position of cutting edge 8a of bucket 8 fluctuates with respect to design surface S, the setting of the opening degrees of proportional solenoid valve 73 and proportional solenoid valve 75 also changes frequently.

Figure 8:
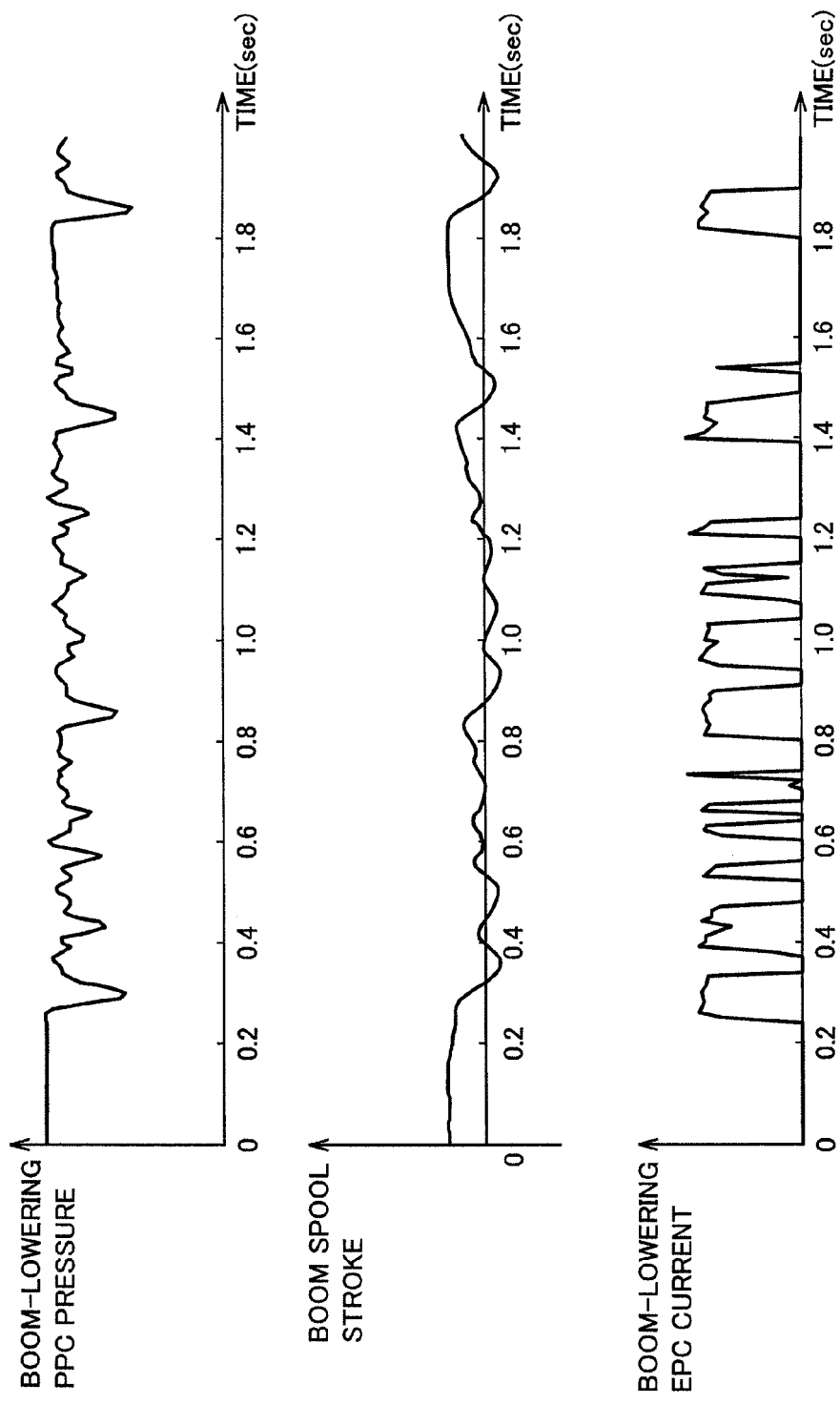
FIG. 8 is a graph showing a change in current when a boom-lowering instruction is provided in the hydraulic excavator before the present invention is applied.

FIG. 8 is a graph showing a change in current when the boom-lowering instruction is provided in the hydraulic excavator before the present invention is applied. All of the horizontal axes of the three graphs in FIG. 8 represent the time (unit: second). The vertical axis of the lower graph among the three graphs in FIG. 8 represents a boom-lowering EPC current, i.e., the magnitude of a current outputted to proportional solenoid valve 73 by controller 20. Each of proportional solenoid valve 73 and proportional solenoid valve 75 is a valve configured such that the opening degree thereof is zero (fully-closed) when the current value is zero, and the opening degree thereof continuously increases with an increase in current value. The vertical axis of the middle graph in FIG. 8 represents a boom spool stroke, i.e., the relative position of the spool when it is assumed that the neutral position of the spool of pilot switching valve for the boom 37 for operating boom cylinder 9 has a coordinate of zero. The vertical axis of the upper graph in FIG. 8 represents a boom-lowering PPC pressure, i.e., the hydraulic pressure in first pilot conduit 53 detected by hydraulic pressure sensor 63.

A value of the boom-lowering EPC current shown in the lower graph in FIG. 8 increases sharply when the current value increases from zero, and thus, an inclination of the graph is steep. Similarly, the value decreases sharply when the current value decreases toward zero, and thus, an inclination of the graph is steep. Therefore, the opening degree of proportional solenoid valve 73 increases sharply upon receipt of the instruction for lowering boom 6, and decreases sharply upon receipt of the instruction for not lowering boom 6. Since the opening degree of proportional solenoid valve 73 fluctuates sharply as described above, the hydraulic oil flows abruptly through first pilot conduit 53 from the first pilot pressure control valve 41A side to the pilot switching valve for the boom 37 side via proportional solenoid valve 73 when the opening degree of proportional solenoid valve 73 is increased from zero. In this case, if supply of the hydraulic oil to first pilot pressure control valve 41A via pump flow path 51 delays, the PPC pressure drops momentarily and the PPC pressure decreases sharply as shown in the upper graph in FIG. 8.

When the PPC pressure decreases, spool 85 and retainer 84 of first pilot pressure control valve 41A (refer to FIGS. 5 and 6) move relatively and spool 85 moves away from retainer 84. Thereafter, the hydraulic oil is supplementarily supplied from pump flow path 51 to first pilot pressure control valve 41A. When the PPC pressure increases, spool 85 and retainer 84 move to return to the original contact state, and spool 85 collides with retainer 84. Due to repetition of sharp increase and decrease in PPC pressure, the collision between spool 85 and retainer 84 occurs frequently and minute vibrations occur in first control lever 44, which brings a sense of discomfort to the operator operating first control lever 44.

Figure 9:
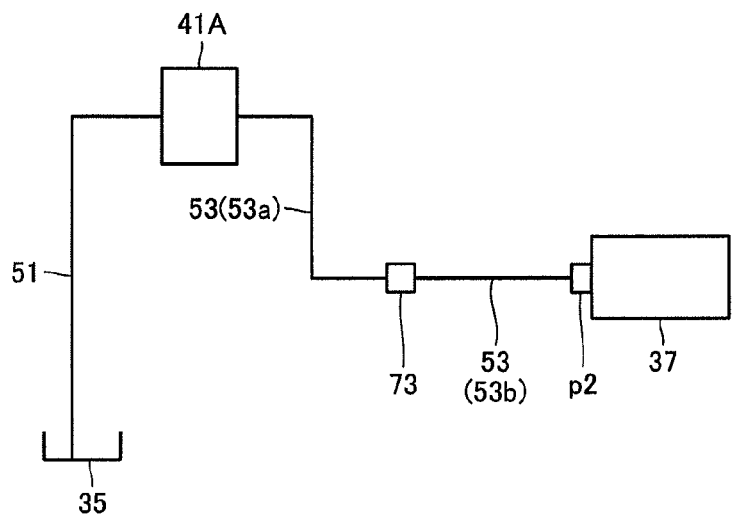
FIG. 9 is a schematic view showing, in a simplified manner, a main portion of a hydraulic circuit shown in FIG. 4.

Hydraulic excavator 1 according to the present embodiment has been made to solve this problem. FIG. 9 is a schematic view showing, in a simplified manner, a main portion of a hydraulic circuit shown in FIG. 4. FIG. 9 illustrates pilot switching valve for the boom 37, proportional solenoid valve 73, first pilot pressure control valve 41A, and tank 35 described with reference to FIG. 4.

FIG. 9 also illustrates first pilot conduit 53 and pump flow path 51. First pilot conduit 53 connects second pilot port p2 of pilot switching valve for the boom 37 and first pilot pressure control valve 41A. One end of first pilot conduit 53 is connected to first pilot pressure control valve 41A. The other end of first pilot conduit 53 is connected to second pilot port p2 of pilot switching valve for the boom 37. Pump flow path 51 connects tank 35 and first pilot pressure control valve 41A.

Pump flow path 51 has a function as an oil supply conduit for supplying the hydraulic oil from tank 35 to first pilot pressure control valve 41A.

First pilot conduit 53 has an upstream pilot conduit 53a on the upstream side and a downstream pilot conduit 53b on the downstream side in the flow of the hydraulic oil flowing from first pilot pressure control valve 41A toward pilot switching valve for the boom 37. Upstream pilot conduit 53a includes one end of first pilot conduit 53. One end of upstream pilot conduit 53a is connected to first pilot pressure control valve 41A. The other end of upstream pilot conduit 53a is connected to proportional solenoid valve 73. Downstream pilot conduit 53b includes the other end of first pilot conduit 53. One end of downstream pilot conduit 53b is connected to proportional solenoid valve 73. The other end of downstream pilot conduit 53b is connected to second pilot port p2 of pilot switching valve for the boom 37.

Figure 10:
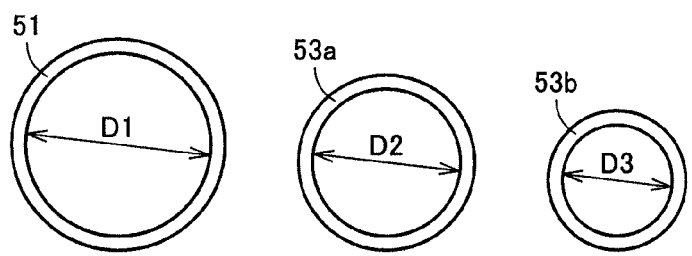
FIG. 10 is a schematic view showing diameters of pipes constituting a hydraulic circuit in a first embodiment.

FIG. 10 is a schematic view showing diameters of pipes constituting a hydraulic circuit in the first embodiment. As shown in FIG. 10, D1 represents a dimension of an inner diameter of pump flow path 51, D2 represents a dimension of an inner diameter of upstream pilot conduit 53a, and D3 represents a dimension of an inner diameter of the downstream pilot conduit. The inner diameter of pump flow path 51 is larger than the inner diameter of upstream pilot conduit 53a, and the inner diameter of upstream pilot conduit 53a is larger than the inner diameter of downstream pilot conduit 53b. That is, dimensions D1, D2 and D3 of the inner diameters of pump flow path 51, upstream pilot conduit 53a and downstream pilot conduit 53b have a relationship expressed by the following inequality:

$$D1 > D2 > D3.$$

Each of pump flow path 51, upstream pilot conduit 53a and downstream pilot conduit 53b is not necessarily limited to a structure configured by one pipe. Various devices such as a joint, a valve, a pump, and a sensor may be included somewhere in the conduit, and a combination of pipes having different inner diameters may be used. In the case of pump flow path 51, a diameter of a circular pipe equal to an average value of a cross section of the flow path extending from tank 35 to first pilot pressure control valve 41A may be regarded as inner diameter D1. In the case of upstream pilot conduit 53a, a diameter of a circular pipe equal to an average value of a cross section of the flow path extending from first pilot pressure control valve 41A to proportional solenoid valve 73 may be regarded as inner diameter D2. In the case of downstream pilot conduit 53b, a diameter of a circular pipe equal to an average value of a cross section of the flow path extending from proportional solenoid valve 73 to second pilot port p2 of pilot switching valve for the boom 37 may be regarded as inner diameter D3.

Figure 11:
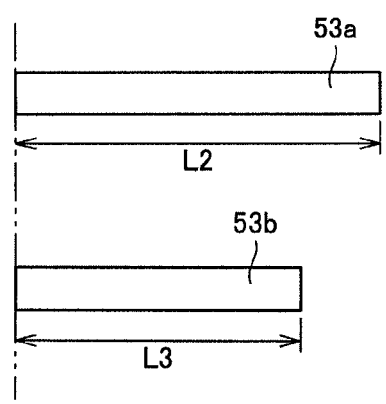
FIG. 11 is a schematic view showing lengths of the pipes constituting the hydraulic circuit in the first embodiment.

FIG. 11 is a schematic view showing lengths of the pipes constituting the hydraulic circuit in the first embodiment. As shown in FIG. 11, L2 represents a length of upstream pilot conduit 53a, and L3 represents a length of downstream pilot conduit 53b. The length of upstream pilot conduit 53a is longer than the length of downstream pilot conduit 53b. That is, length L2 of upstream pilot conduit 53a and length L3 of downstream pilot conduit 53b have a relationship expressed by the following inequality:

$$L2 > L3.$$

As described above, various devices such as a joint, a valve, a pump, and a sensor may be included somewhere in upstream pilot conduit 53a and downstream pilot conduit 53b. In the case of upstream pilot conduit 53a, a length of the flow path extending from first pilot pressure control valve 41A to proportional solenoid valve 73 may be regarded as length L2. In the case of downstream pilot conduit 53b, a length of the flow path extending from proportional solenoid valve 73 to second pilot port p2 of pilot switching valve for the boom 37 may be regarded as length L3.

A boundary between upstream pilot conduit 53a and first pilot pressure control and proportional solenoid valves 41A and 73 may be defined as a position that is typically considered as a valve boundary portion. For example, when proportional solenoid valve 73 has a flange-type interface, a surface where the flanges face each other may be regarded as the boundary. For example, when proportional solenoid valve 73 has a screw-in-type interface in which the pipes are screwed in a valve box of proportional solenoid valve 73, a position corresponding to an outer circumferential surface of the valve box may be regarded as the boundary.

Upstream pilot conduit 53a and downstream pilot conduit 53b have the relationships of the dimensions of the inner diameters shown in FIG. 10 and the lengths shown in FIG. 11. Thus, as a result, the volume of upstream pilot conduit 53a is larger than the volume of downstream pilot conduit 53b.

Next, the function and effect of the present embodiment will be described.

According to the present embodiment, as shown in FIG. 9, first pilot conduit 53 has upstream pilot conduit 53a between first pilot pressure control valve 41A and proportional solenoid valve 73, and downstream pilot conduit 53b between proportional solenoid valve 73 and second pilot port p2 of pilot switching valve for the boom 37. As shown in FIGS. 10 and 11, the volume of upstream pilot conduit 53a is larger than the volume of downstream pilot conduit 53b.

When proportional solenoid valve 73 is switched from the fully-closed state to the open state in the setting of automatically controlling the operation for raising boom 6, the hydraulic oil flows through first pilot conduit 53. At this time, the hydraulic oil flows from upstream pilot conduit 53a on the first pilot pressure control valve 41A side to downstream pilot conduit 53b on the pilot switching valve for the boom 37 side via proportional solenoid valve 73. By making the volume of upstream pilot conduit 53a larger relatively, an amount of the hydraulic oil present in upstream pilot conduit 53a increases. As a result, a ratio of an amount of the hydraulic oil flowing out of upstream pilot conduit 53a when proportional solenoid valve 73 is opened to an amount of the hydraulic oil present in upstream pilot conduit 53a before proportional solenoid valve 73 is opened becomes relatively low.

Therefore, sharp decrease in amount of the hydraulic oil present in upstream pilot conduit 53a can be suppressed. Fluctuations in amount of the oil in upstream pilot conduit 53 caused by the operation for opening proportional solenoid valve 73 can be reduced, and as a result, fluctuations in pressure of the hydraulic oil in upstream pilot conduit 53a can be suppressed. Therefore, the frequency of increase and decrease in PPC pressure can be reduced. That is, in hydraulic excavator 1 according to the present embodiment, frequent occurrence of the decrease in PPC pressure is prevented, and thus, the frequency of the collision between spool 85 and retainer 84 of first pilot pressure control valve 41A is low. Therefore, in hydraulic excavator 1 according to the present embodiment, occurrence of minute vibrations in first control lever 44 can be suppressed, and thus, occurrence of the problem of bringing a sense of discomfort to the operator can be avoided.

In addition, as shown in FIG. 10, inner diameter D2 of upstream pilot conduit 53a is larger than inner diameter D3 of downstream pilot conduit 53b. Thus, even when length L3 of downstream pilot conduit 53b is equal to length L2 of upstream pilot conduit 53a, or is longer than length L2 of upstream pilot conduit 53a, the volume of upstream pilot conduit 53a can be made larger than the volume of downstream pilot conduit 53b. Therefore, such a configuration that the volume of upstream pilot conduit 53a is larger than the volume of downstream pilot conduit 53b can be realized more easily.

In addition, as shown in FIG. 9, the hydraulic excavator further includes pump flow path 51 supplying the hydraulic oil to first pilot pressure control valve 41A. As shown in FIG. 10, inner diameter D1 of pump flow path 51 is larger than inner diameter D2 of upstream pilot conduit 53a.

When proportional solenoid valve 73 is switched to the closed state and the hydraulic oil flows from upstream pilot conduit 53a to downstream pilot conduit 53b, the fluctuations in PPC pressure can be suppressed more reliably if the hydraulic oil is supplementarily supplied to first pilot pressure control valve 41A immediately. By increasing inner diameter D1 of pump flow path 51, pressure loss of the hydraulic oil flowing via pump flow path 51 can be reduced and supplementary supply of the hydraulic oil to first pilot pressure control valve 41A can be promoted. Therefore, the decrease in PPC pressure can be suppressed more reliably, and the collision between spool 85 and retainer 84 of first pilot pressure control valve 41A can be suppressed, and the occurrence of minute vibrations in first control lever 44 can be suppressed more reliably.

The present embodiment shown in FIG. 10 has such a configuration that inner diameter D1 of pump flow path 51 is larger than inner diameter D2 of upstream pilot conduit 53a. In order to reduce the pressure loss in pump flow path 51 to such an extent that the hydraulic oil can flow through pump flow path 51 smoothly and can be supplementarily supplied to first pilot pressure control valve 41A immediately, it is only necessary that inner diameter D1 of pump flow path 51 is not smaller than inner diameter D2 of upstream pilot conduit 53a. From this viewpoint, inner diameter D1 of pump flow path 51 may be equal to inner diameter D2 of upstream pilot conduit 53a. That is, inner diameter D1 of pump flow path 51 may be equal to or larger than inner diameter D2 of upstream pilot conduit 53a.

Second Embodiment

Figure 12:
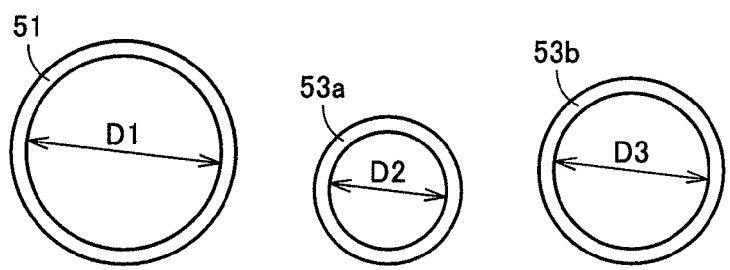
FIG. 12 is a schematic view showing diameters of pipes constituting a hydraulic circuit in a second embodiment.
Figure 13:
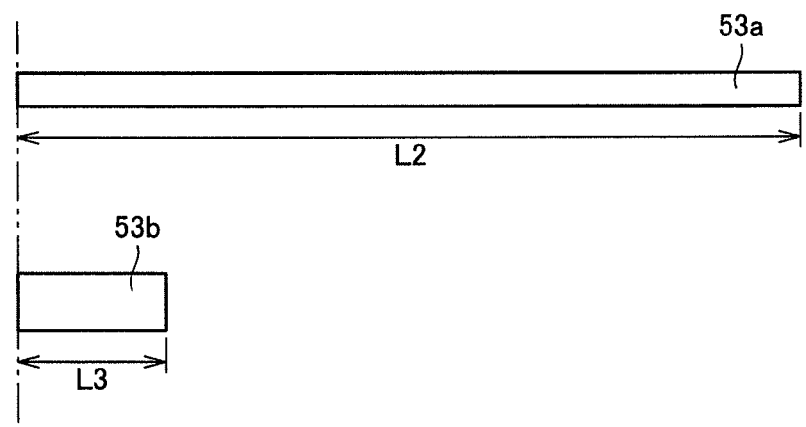
FIG. 13 is a schematic view showing lengths of the pipes constituting the hydraulic circuit in the second embodiment.

FIG. 12 is a schematic view showing diameters of pipes constituting a hydraulic circuit in a second embodiment. FIG. 13 is a schematic view showing lengths of the pipes constituting the hydraulic circuit in the second embodiment. In the aforementioned first embodiment, description has been given to the example in which inner diameter D2 of upstream pilot conduit 53a is larger than inner diameter D3 of downstream pilot conduit 53b. As for upstream pilot conduit 53a and downstream pilot conduit 53b, it is only necessary that the volume of upstream pilot conduit 53a is larger than the volume of downstream pilot conduit 53b, regardless of the inner diameters.

Therefore, even when inner diameter D2 of upstream pilot conduit 53a is smaller than inner diameter D3 of downstream pilot conduit 53b as shown in FIG. 12, it is possible to make length L2 of upstream pilot conduit 53a much longer than length L3 of downstream pilot conduit 53b as shown in FIG. 13. Thus, such a configuration that the volume of upstream pilot conduit 53a is larger than the volume of downstream pilot conduit 53b can be obtained, and the function and effect described in the first embodiment can be similarly obtained.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST 1 hydraulic excavator; 2 undercarriage; 3 upper revolving unit; 4 cab; 5 work implement; 6 boom; 7 arm; 8 bucket; 8a cutting edge; 9 boom cylinder; 20 controller; 34 main operation valve; 35 tank; 37 pilot switching valve for the boom; 41 first control lever device; 41A to 41D, 42A to 42D pilot pressure control valve; 42 second control lever device; 44 first control lever; 45 second control lever; 50 third hydraulic pump; 51, 55 pump flow path; 52 tank flow path; 53, 54, 56 to 61 pilot conduit; 53a upstream pilot flow path; 53b downstream pilot flow path; 63, 64, 66 to 69 hydraulic pressure sensor; 70 relay block; 73 to 79 proportional solenoid valve; 80 shuttle valve; 81 valve main body; 82 cylinder portion; 83 piston; 84 retainer; 85 spool; 86 main spring; 87 spring; D1 to D3 inner diameter; G3 to G9 instruction signal; L2, L3 length; P3, P4, P6 to P9 pressure signal; S design surface; p1 first pilot port; p2 second pilot port.

The invention claimed is:

1. A hydraulic excavator, comprising:
a boom;
a control lever operated by an operator;
a pilot pressure control valve outputting a pilot pressure in accordance with operation of said control lever;
an upstream pilot conduit having one end connected to said pilot pressure control valve;
a proportional solenoid valve connected to another end of said upstream pilot conduit;
a downstream pilot conduit having one end connected to said proportional solenoid valve; and
a pilot switching valve having a boom-lowering pilot port connected to another end of said downstream pilot conduit, and controlling operation of said boom, wherein
a volume of said upstream pilot conduit is larger than a volume of said downstream pilot conduit.

2. The hydraulic excavator according to claim 1, wherein an inner diameter of said upstream pilot conduit is larger than an inner diameter of said downstream pilot conduit.

3. The hydraulic excavator according to claim 2, further comprising
an oil supply conduit supplying a hydraulic oil to said pilot pressure control valve, wherein
an inner diameter of said oil supply conduit is equal to or larger than said inner diameter of said upstream pilot conduit.

4. The hydraulic excavator according to claim 2, further comprising:
a bucket having a cutting edge; and
a controller controlling said hydraulic excavator, wherein
said controller controls said boom to prevent a position of said cutting edge from becoming lower than a design surface according to construction design data.

5. The hydraulic excavator according to claim 2, further comprising
a controller controlling said hydraulic excavator, wherein
said controller transmits and receives information to and from an external communication station by satellite communication.

6. The hydraulic excavator according to claim 1, further comprising an oil supply conduit supplying a hydraulic oil to said pilot pressure control valve, wherein an inner diameter of said oil supply conduit is equal to or larger than an inner diameter of said upstream pilot conduit.

7. The hydraulic excavator according to claim 6, further comprising:

a bucket having a cutting edge; and a controller controlling said hydraulic excavator, wherein said controller controls said boom to prevent a position of said cutting edge from becoming lower than a design surface according to construction design data.

8. The hydraulic excavator according to claim 6, further comprising a controller controlling said hydraulic excavator, wherein said controller transmits and receives information to and from an external communication station by satellite communication.

9. The hydraulic excavator according to claim 1, further comprising:

a bucket having a cutting edge; and a controller controlling said hydraulic excavator, wherein said controller controls said boom to prevent a position of said cutting edge from becoming lower than a design surface according to construction design data.

10. The hydraulic excavator according to claim 9, further comprising a controller controlling said hydraulic excavator, wherein said controller transmits and receives information to and from an external communication station by satellite communication.

11. The hydraulic excavator according to claim 1, further comprising a controller controlling said hydraulic excavator, wherein said controller transmits and receives information to and from an external communication station by satellite communication.

* * * * *